United States Patent Office 3,293,984
Patented Dec. 27, 1966

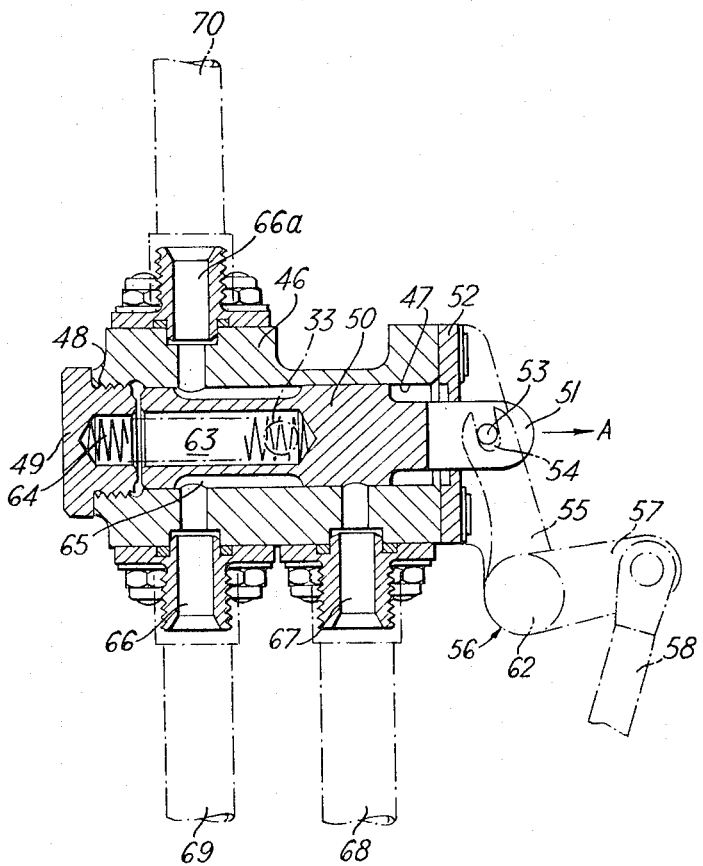

3,293,984
VEHICLE ESCAPE SYSTEMS
James Martin, Southlands Manor, Southlands Road, Denham, near Uxbridge, England
Filed Oct. 6, 1964, Ser. No. 401,788
Claims priority, application Great Britain, Oct. 7, 1963, 39,454/63
2 Claims. (Cl. 89—1)

This invention relates to vehicle escape systems and, in particular, to escape systems for aircraft and other vehicles such as rockets, spacecraft, and the like all, for the purposes of the present invention, being called "aircraft."

With the advance that has taken place in the development of aircraft escape systems including ejection seats, the likelihood of an airman having to enter the water while in his aircraft, or, in the event of an emergency while over the sea, has been reduced to almost negligible proportions. However, in the case of aircraft operating from naval aircraft carriers, there is an even present danger of an airman and his aircraft entering the water as a result of the aircraft failing to be arrested by the arrestor devices on the carrier and falling over the side of the carrier, or as a result of engine failure or like mishap during take-off.

It was with this hazard in mind that the escape system described and claimed in my U.S. Patent No. 3,180,593 was devised.

Such ejection system included a pressure sensitive mechanism which is described and claimed in the specification of my U.S. application No. 258,833, filed on Feb. 15, 1963.

Such pressure sensitive mechanism was subsequently improved so that it could not be operated, otherwise than in an emergency calling for such operation, as a result, for example, of malfunction of the device or as a result of acceleration induced loads on the device in the course of violent flight manoeuvres.

This improved device included means to ensure that a diaphragm in the device could not become subjected to pressure differentials of a magnitude and sense appropriate to effect actuation of the device as a result of the development of an unsuspected leak in such diaphragm.

Although the improved pressure sensitive device was operatively very satisfactory, it had the disadvantage of failing to indicate if and when a leak occurred in the diaphragm.

Thus, one object of this invention is to provide a new or improved ejection system for ejecting an ejection seat from a submerged aircraft including such a pressure sensitive device which more satisfactorily meets modern day requirements.

According to this invention there is provided an ejection system for ejecting an ejection seat from a submerged aircraft, such system including a source of pressure fluid, an ejection gun connected to said source, and a pressure sensitive mechanism for releasing pressure fluid from said source, a safety device being interposed between said source and said gun, such safety device being settable to a condition effectively to isolate, functionally, the pressure sensitive mechanism from the ejection gun.

According to one feature of this invention, said safety device may comprise a valve interposed between said pressure fluid source and said ejection gun, such valve including a valve member adapted to be moved from an operative position in which pressure fluid from said source may enter said ejection gun to an inoperative position where pressure fluid from said pressure source is allowed freely to escape.

Very conveniently, said valve may comprise a generally cylindrical body having a single inlet port and at least two outlet ports, a first of such outlet ports being connected to said ejection gun.

Very conveniently three said outlet ports may be provided, the first of such outlet ports being connected to said ejection gun and a second outlet port being connected to a drogue gun disabling device.

The said valve member may comprise a cylindrical piston adapted to be moved axially within said body from said operative to said inoperative position and vice versa respectively to isolate said inlet port from communication with at least one of said outlet ports so as to close one or other of said outlet ports while placing such inlet port in open communication with another of said outlet ports.

If desired said valve member may be provided with a rebate which is at all times in open communication with said inlet port.

According to another feature of this invention, said valve member may be adapted to be moved within the said valve body by means of linkage associated with a operating handle adapted to be moved manually by the occupant of the ejection seat.

In a preferred embodiment of this invention said valve may be adapted to be secured to a side exit in the pressure sensitive mechanism through which pressure escaping from the pressure fluid source flows.

Very conveniently, said pressure sensitive mechanism may comprise a diaphragm adapted to be displaced by pressure to which the mechanism is to respond, a spring-biased plunger having a collar thereon and a lever co-operating with said diaphragm, said collar normally restraining said plunger in an inoperative position and said lever being adapted to be moved clear of said collar to release the plunger for movement by its spring-biasing to an operative position in response to movement of the diaphragm under pressure in excess of a predetermined value to cause pressure fluid to be released from said source.

Preferably said pressure sensitive mechanism may include means for generating gas pressure to cause said diaphragm to be subjected to pressure in excess of said predetermined value to cause release of said plunger so that pressure fluid is released from said source.

According to yet a further feature of this invention, the said outlet port which is connected to said ejection gun may also be connected to a drogue gun disabling device.

In order that this invention may be more readily understood one embodiment of ejection system including said safety device will now be described by way of example and with reference to the accompanying drawings in which:

FIGURE 3 is a vertical medial section on the line III—III of FIGURE 2 showing the safety device.

Figure 1:
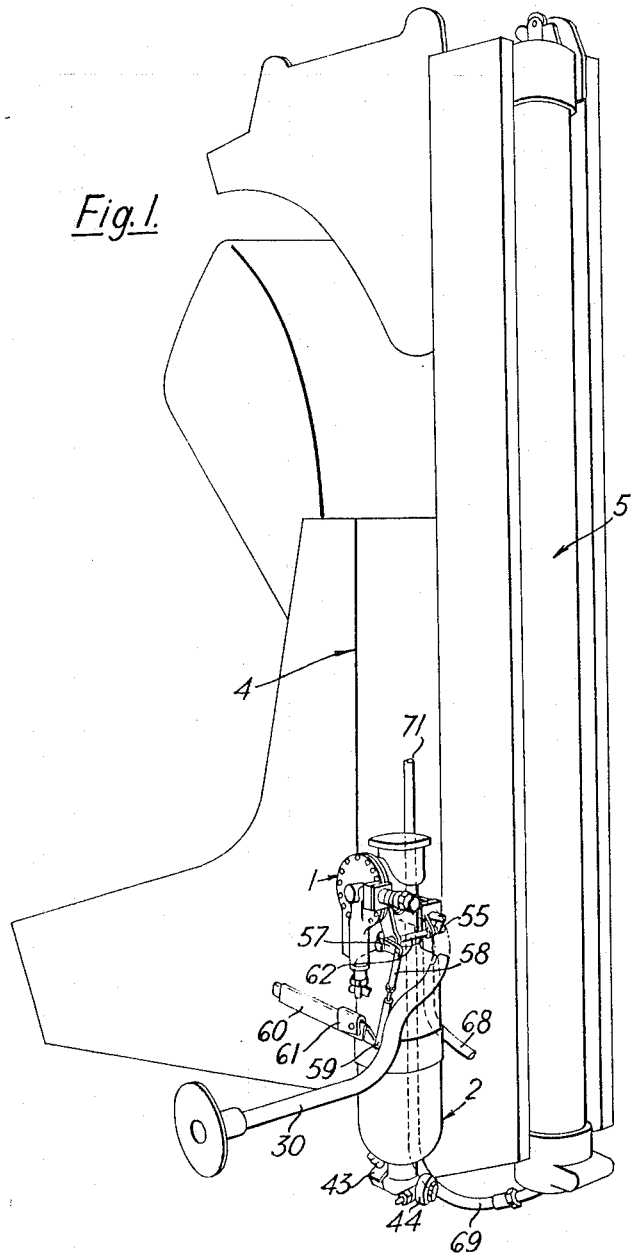
FIGURE 1 is a perspective view of the ejection seat carrying an ejection gun, such seat carrying the ejection system in accordance with this invention.
Figure 2:
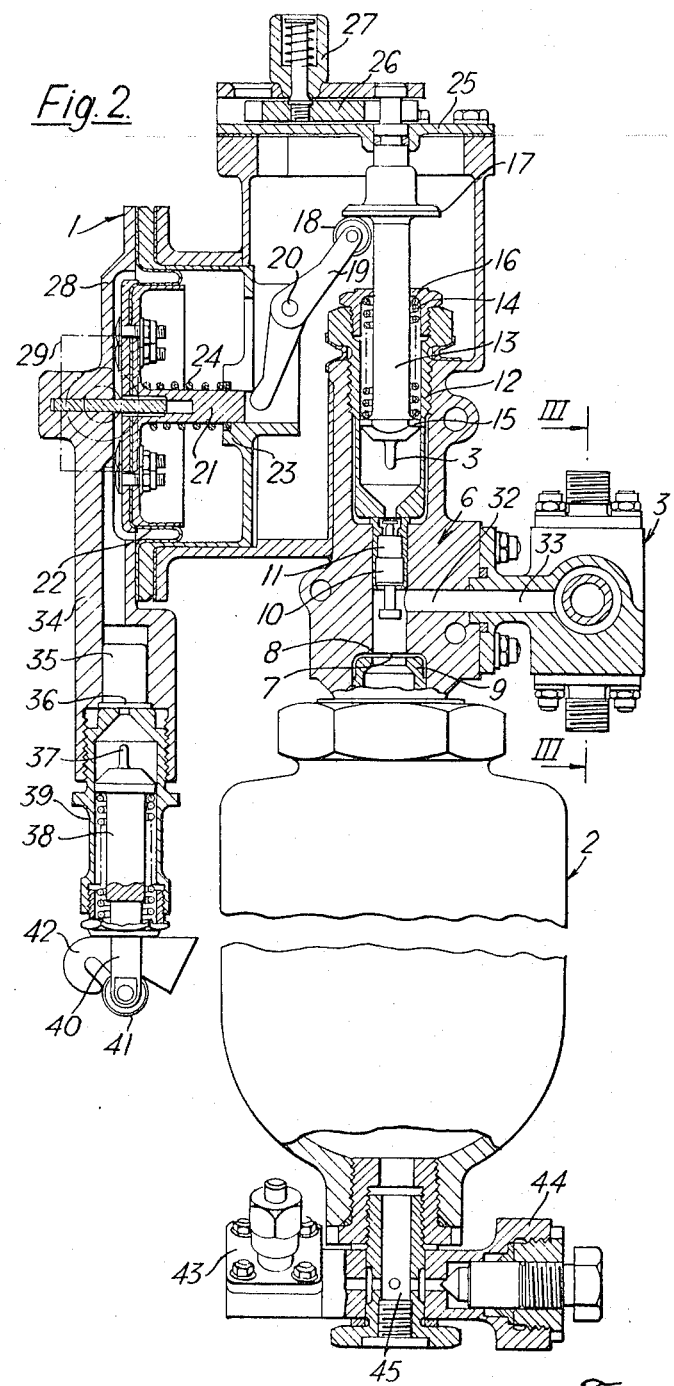
FIGURE 2 is a vertical part sectional view through the pressure sensitive mechanism, pressure fluid source and safety device constituting the ejection system according to this invention.

In this embodiment the system comprises a pressure sensitive mechanism generally designated 1, a pressure fluid source in the form of a bottle 2 and a safety device 3, all attached to an ejection seat 4 carrying an ejection gun 5.

In this embodiment the pressure sensitive mechanism 1 comprises a substantially tubular body 6, one end of which is adapted to be threadedly and sealingly secured to the head of said bottle 2 which houses compressed air. In the normal condition of the mechanism, as shown in FIGURE 1, such end of the body 6 is closed by a frangible disc 7 trapped against an annular seat 8 by a tubular retaining stud 9.

The frangible disc 7 is adapted to be punctured by a pin 10 within the body 6 of the pressure sensitive mechanism. One end of this pin 10 lies adjacent an explosive cartridge 11 adapted to have its percussion cap lying adjacent the open end of a cylindrical sleeve 12 which constitutes a cylinder for a reciprocably movable plunger 13, the plunger being urged towards the percussion cap of the cartridge 11 by a compression spring 14 acting between a shoulder 15 on the plunger 13 and a plug 16 at the end of the cylindrical sleeve 12 remote from said cartridge 11.

The end of the plunger 13 remote from the cartridge 11 carries a slightly dished or saucer-like collar 17 retained near the end of the plunger 13 in any suitable way, for example by means of a locking nut.

This collar 17 is normally engaged by a roller 18 at one end of a rocking lever 19 pivoted between its ends on a transverse pin 20 and lying in an enlargement of the body 6 so as to extend alongside the plunger 13. When the roller 18 on the lever 19 engages the dished collar 17 the plunger 13 is in an inoperative retracted position but the compression spring 14 is stressed or energised.

The other end of the rocking lever 19 is engaged by a spindle 21 projecting from the centre of a flexible diaphragm 22 that covers an opening in the side wall of the body 6, the spindle 21 being perpendicular to the axis of the body bore and to the general plane of the diaphragm 22. The spindle 21 is guided for longitudinal movement by a guide boss 23 in a spider arranged in said enlargement of the body 6 and is urged away from the boss 23 by a spring 24.

A removable sealing cap 25 closes the end of the body 6 remote from the frangible disc 7 and this sealing cap 25 has an aperture therein through which the end of the plunger 13 remote from said frangible disc 7 passes, the end portion of the plunger 13 which protrudes through the cap 25 being adapted to be engaged by a slotted sliding member 26 so that the plunger 23 may be retained in its inoperative position while the mechanism is being inspected or serviced. A spring-biassed plug 27 is provided for restraining the slotted sliding member 26 against movement.

The said opening covered by the diaphragm 22 is also covered by a detachable cap 28 forming part of the body wall and this cap 28 carries a boss, shown diagrammatically at 29, which is adapted to be connected to a pipe or duct 30 in communication with the outside of an ejection seat-equipped aircraft, so that hydrostatic pressure applied to the aircraft upon immersion of the aircraft will be transmitted to the diaphragm 22 to tend to cause movement of this diaphgram 22 and its spindle 21 to rock the rocking lever 19 about its transverse pin 20, and release the collar 17 on the plunger 13 from engagement of the roller 18 on said lever 19.

The saucer-like collar 17 causes movement of the plunger 13, against the action of the spring 14 to occur prior to releasing the collar but once the roller 18 is disengaged from the collar 17 the plunger 13 is allowed to move under the influence of the compression spring 14 so that a firing pin 31 at the end of the plunger 13 is driven into the percussion cap of the cartridge 11 to fire the latter. Firing of this cartridge 11 generates gas pressure which propels the pin 10 towards the disc 7 so that the latter is punctured and compressed air within the bottle 2 will be released and will flow from the bottle 2 around the pin 10 into a side exit 32 where it enters an inlet port 33 in the said safety device 3, which will be more fully described hereinafter.

Adjacent the boss 29 is a secondary housing 34 which carries a gas-generating cartridge 35 having a percussion cap 36 adapted to be struck by a firing pin 37 carried on a spring-biassed plunger 38 which rides in a cylindrical sleeve 39, such plunger 38 having a bifurcated end 40 and the birfucated end and the arms of this end embrace a roller 41. A sear 42 is adapted to lie between the arms of the bifurcated end 40 so that withdrawal of the sear 42 will cause the plunger 38 to energise the spring means so that once the sear 42 is withdrawn from the plunger 38, the firing pin 37 will strike the percussion cap 36 of the gas-generating cartridge 35 so that pressure fluid will pass down the secondary housing 34 and act on the diaphragm 22.

This arrangement enables the occupant of the ejection seat to manually cause the pressure sensitive mechanism to be actuated, so that if he were conscious at the time when his aircraft entered the water he could actuate the pressure sensitive mechanism without waiting for the diaphragm 22 to be acted upon by hydrostatic pressure caused through water flowing up the duct 30.

In this embodiment the bottle 2 is provided with inlet and outlet means respectively generally designated 43 and 44, a central valve member 45 being provided to enable conduits to be connected to these inlets and outlets 43 and 44 for emptying or refilling the bottle 2.

The said safety device comprises a generally cylindrical body 46 having a central tubular bore 47 therethrough, one end of this bore being internally screw-threaded at 48 to receive an externally screw-threaded plug 49 which closes one end of the bore 47. Adapted to ride in said bore 47 is a substantially cylindrical piston 50, this piston 50 having an end part 51 protruding through a removable closure cap 52, said end part 51 carrying a transverse pin 53 adapted to ride in an open-ended slot 54 on one arm 55 of a bell-crank lever generally designated 56 and being diagrammatically indicated in dot-and-pick lines in FIGURE 3 of the accompanying drawings.

A second arm 57 of this bell-crank lever 56 is pivotally connected to a link 58 which is pivotally connected at 59 to one end of a manually operable handle 60, which is itself pivotally connected to a bracket 61 associated with the ejection seat 4. A common spindle 62 carries the arms 55 and 57 in spaced parallelism and this common spindle 62 is carried by a pair of webs secured respectively to the pressure sensitive mechanism and said safety device.

The said cylindrical piston 50 has a blind bore 63 which is adapted to house a spring and one end of said spring is located within this blind bore 63 and the other end is located in a blind bore 64 in the said plug 49. The said cylindrical piston 50 is provided with an annular rebate 65 around a portion of the periphery thereof, this rebate 65 at all times being in open communication with the inlet port 33.

In addition to the said inlet port 33 in the cylindrical body 46 three outlet ports 66, 66a and 67 are provided, the outlet port 66a being diametrically opposed to said outlet port 66. The said cylindrical piston 50 may be moved from its operative position, namely the position shown in FIGURE 3, to an inoperative position in which the piston 50 is moved in the direction of the arrow A in FIGURE 3.

In the inoperative position the inlet port 33 and outlet port 67 are in open communication with one another as a result of the rebate 65, so that if pressure fluid escapes from said bottle 2 the fluid will merely pass from the port 33 around the annular rebate 65 and into the outlet port 67 which is connected, by means of a conduit 68, to the atmosphere. On the other hand, when the cylindrical piston 50 is in the operative position as shown in FIGURE 3, the inlet port 33 is placed into communication with the outlet ports 66 and 66a, the port 66 being connected to a conduit 69 which is in turn connected to the ejection gun 5. The port 66a is the inlet of a conduit 70 which is connected to a drogue gun release mechanism, not otherwise shown.

In practice the said manually operable handle 60 is normally positioned so that the inlet port 33 is in communication with the outlet port 67, namely in a position where the cylindrical piston 50 lies in its inoperative position and, should, due to some unforeseen circumstances, the pressure sensitive mechanism cause the frangible diaphragm 7 to be punctured, pressure fluid egressing from the bottle 2 will merely be discharged to the atmosphere through the conduit 68.

However, just prior to landing the aircraft on an aircraft carrier, or while flying the aircraft at low level over the sea, for example, the airman would move this handle 60 so that the cylindrical piston 50 would be moved to its operative position, i.e. the position shown in FIGURE 3, in order that pressure fluid discharged from the bottle 2 will pass from the inlet port 33 into the outlet ports 66 and 66a and thence into the conduits 69 and 70 to the ejection gun 5 and drogue gun release mechanism.

I claim:

1. An ejection system for ejecting an ejection seat from a submerged aircraft, such system including: a source of pressure fluid; an ejection gun connected to said source; and a pressure sensitive mechanism comprising a diaphragm adapted to be displaced by the pressure to which the mechanism is to respond, a spring-biased plunger having a collar thereon, and a lever cooperating with said diaphragm and said collar normally to restrain said plunger, said lever being adapted to be moved clear of said collar to release the plunger for movement by its spring-biassing to an operative position in response to movement of the diaphragm under pressure in excess of a predetermined value; a safety device being interposed between said source and said gun, such safety device comprising a valve secured to said pressure sensitive mechanism, said valve comprising a valve body and a valve member, said valve body defining three outlet ports and one inlet port, said valve member defining a rebate which is at all times in communication with said inlet port and which can be moved from an operative position in which it lies in communication with two said outlet ports or to an inoperative position where it lies in communication with only one said outlet port.

2. A system according to claim 1, wherein gas generating means are provided to cause said diaphragm to be subjected to a pressure in excess of said predetermined value.

References Cited by the Examiner
UNITED STATES PATENTS 2,693,326  11/1954  Lobelle _____ 89—1 X
2,859,696  11/1958  Burg _____ 102—7
3,122,313  2/1964   Glattli _____ 137—625.27 X
3,180,593  4/1965   Martin _____ 244—122

SAMUEL FEINBERG, *Primary Examiner.*

SAMUEL W. ENGLE, *Examiner.*